United States Patent
Lee et al.

(10) Patent No.: US 9,766,523 B2
(45) Date of Patent: Sep. 19, 2017

(54) LIQUID CRYSTAL DISPLAY

(71) Applicant: Samsung Display Co., Ltd., Yongin-si, Gyeonggi-do (KR)

(72) Inventors: Sang-Myoung Lee, Seoul (KR); Hyun-Ho Kang, Ansan-si (KR); O Sung Seo, Seoul (KR); Seung Jun Yu, Cheonan-si (KR); Ha Won Yu, Suwon-si (KR); Ki Kyung Youk, Bucheon-si (KR); Yeo Geon Yoon, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/060,898

(22) Filed: Mar. 4, 2016

(65) Prior Publication Data

US 2016/0320676 A1 Nov. 3, 2016

(30) Foreign Application Priority Data

Apr. 29, 2015 (KR) ........................ 10-2015-0060607

(51) Int. Cl.
| | |
|---|---|
| *G02F 1/1362* | (2006.01) |
| *G09G 3/36* | (2006.01) |
| *G02F 1/1343* | (2006.01) |
| *G02F 1/1337* | (2006.01) |

(52) U.S. Cl.
CPC ..... *G02F 1/136286* (2013.01); *G09G 3/3648* (2013.01); *G02F 1/13624* (2013.01); *G02F 1/133707* (2013.01); *G02F 2001/134345* (2013.01); *G09G 2300/043* (2013.01); *G09G 2300/0819* (2013.01)

(58) Field of Classification Search
CPC ............... G02F 1/13628; G02F 1/1368; G02F 1/134309
USPC .............................................................. 257/72
See application file for complete search history.

(56) References Cited

U.S. PATENT DOCUMENTS

| | | | | |
|---|---|---|---|---|
| 2009/0040413 | A1* | 2/2009 | Chen ................... | G02F 1/13624 349/48 |
| 2010/0001276 | A1* | 1/2010 | Kim ................... | G02F 1/136227 257/59 |
| 2012/0074416 | A1* | 3/2012 | Kim ................... | G02F 1/13624 257/59 |

FOREIGN PATENT DOCUMENTS

| | | |
|---|---|---|
| KR | 10-2009-0123247 A | 12/2009 |
| KR | 10-2011-0089615 A | 8/2011 |
| KR | 10-1433615 | 8/2014 |

* cited by examiner

*Primary Examiner* — Kenneth Parker
*Assistant Examiner* — Warren H Kilpatrick
(74) *Attorney, Agent, or Firm* — Innovation Counsel LLP

(57) ABSTRACT

A liquid crystal display according to an exemplary embodiment of the present disclosure includes: a first substrate; a gate line formed on the first substrate and extended in a first direction; a data line extended in a second direction that is perpendicular to the gate line; switching elements connected to the gate line and the data line; a voltage-dividing reference voltage line connected to a switching element; a first sub-pixel electrode connected to a switching element; and a second sub-pixel electrode connected to a switching element, wherein the first sub-pixel electrode and the second sub-pixel electrode include one or more vertical stem parts formed on a left side or a right side thereof, and the voltage-dividing reference voltage line is formed to be parallel to the data line.

14 Claims, 14 Drawing Sheets

LIQUID CRYSTAL DISPLAY

CROSS-REFERENCE TO RELATED APPLICATION

This application claims priority to and the benefit of Korean Patent Application No. 10-2015-0060607 filed in the Korean Intellectual Property Office on Apr. 29, 2015, the entire contents of which are incorporated herein by reference.

BACKGROUND (a) Field

The present disclosure relates to a liquid crystal display.

(b) Description of the Related Art

A liquid crystal display is a widely used type of display and generally includes two sheets of display panels on which electric field generating electrodes, such as a pixel electrode, a common electrode, and the like, are formed, and a liquid crystal layer interposed therebetween. The liquid crystal display displays an image by applying a voltage to the electric field generating electrodes to generate an electric field in the liquid crystal layer and consequently, determining a direction of liquid crystal molecules in the liquid crystal layer and controlling the polarization of incident light.

As the liquid crystal display is commonly used as a display for televisions, its screen size has been gradually increased. However, as the size of the liquid crystal display is increased, the difference between the viewing distance from the central portion of the screen to a viewer and the viewing distance from the left/right ends of the screen to the viewer may also be increased.

In order to compensate for the difference in viewing distances described above, the display may be bent in a concave shape or a convex shape so as to be formed in a curved shape. The display may be a portrait type in which its height is longer than its width and bent in a vertical direction, or may be a landscape type in which its height is shorter than its width and bent in a horizontal direction, with respect to the viewer.

However, this curved type of liquid crystal display in the related art may have problems. For example, some of these displays may have a structure for solving a misalignment problem between its upper and lower plates, and a dark space may occur in the structure. In such cases, transmittance may be reduced.

The above information disclosed in this Background section is only for enhancement of understanding of the background of the disclosure and therefore may contain information that does not form the prior art that is already known in this country to a person of ordinary skill in the art.

SUMMARY

The present disclosure provides a liquid crystal display having advantages of preventing an occurrence of a dark space that may occur in a stem part of a pixel electrode, while disposing a voltage-dividing reference voltage line so as to minimize its overlap with the pixel electrode.

An exemplary embodiment of the present disclosure provides a liquid crystal display including: a first substrate; a gate line formed on the first substrate and extended in a first direction; a data line extended in a second direction that is perpendicular to the gate line; a first switching element connected to the gate line and the data line; a second switching element connected to the gate line and the data line; a third switching element connected to the second switching element; a voltage-dividing reference voltage line connected to the third switching element; a first sub-pixel electrode connected to the first switching element; and a second sub-pixel electrode connected to the second switching element, wherein the first sub-pixel electrode and the second sub-pixel electrode include one or more vertical stem parts formed on the left side or the right side thereof, and the voltage-dividing reference voltage line is formed to be parallel to the data line.

The voltage-dividing reference voltage line may be formed on one side of the pixel electrode.

The liquid crystal display may further include a dummy voltage-dividing reference voltage line disposed on the same layer as the voltage-dividing reference voltage line, wherein the dummy voltage-dividing reference voltage line is formed to overlap with the one or more vertical stem parts, and the vertical stem part overlapped with the dummy voltage-dividing reference voltage line protrudes further away from the first substrate than other areas of the pixel electrode.

The first sub-pixel electrode may further include a first vertical stem part, a first horizontal stem part extended from the center of the first vertical stem part to a side opposite to a side on which the first vertical stem part is formed, and first fine branch parts extended from both sides of the first horizontal stem part in diagonal directions, and the second sub-pixel electrode may further include a second vertical stem part and a third vertical stem part, a second horizontal stem part extended from the center of the second vertical stem part to a side opposite to a side on which the second vertical stem part is formed, second fine branch parts extended to both sides of the second horizontal stem part in diagonal directions, a third horizontal stem part extended from the center of the third vertical stem part to a side opposite to a side on which the third vertical stem part is formed, and third fine branch parts extended from both sides of the third horizontal stem part in diagonal directions.

The dummy voltage-dividing reference voltage line may include a first dummy voltage-dividing reference voltage line and a second dummy voltage-dividing reference voltage line, the first dummy voltage-dividing reference voltage line may be overlapped with the first vertical stem part, and the second dummy voltage-dividing reference voltage line may be overlapped with the third vertical stem part.

The first dummy voltage-dividing reference voltage line may have a length corresponding to the first vertical stem part, and the second dummy voltage-dividing reference voltage line may have a length corresponding to the third vertical stem part.

The second dummy voltage-dividing reference voltage line may have a length corresponding to the second sub-pixel electrode.

The first vertical stem part may be formed on the left side of the first sub-pixel electrode, and the third vertical stem part may be formed on the left side of the second sub-pixel electrode.

The dummy voltage-dividing reference voltage line may be formed to be electrically isolated from other lines.

The liquid crystal display may be bent along the first direction.

The first vertical stem part may be formed on the left side of the first sub-pixel electrode, and the second vertical stem part may be formed on the left side of the second sub-pixel electrode.

The first vertical stem part may be formed on the right side of the first sub-pixel electrode, and the second vertical stem part may be formed on the right side of the second sub-pixel electrode.

The dummy voltage-dividing reference voltage line may be formed to be electrically isolated from other lines.

The liquid crystal display may be bent along the first direction.

The first vertical stem part may be formed on the right side of the first sub-pixel electrode, and the second vertical stem part may be formed on the right side of the second sub-pixel electrode.

The protrusion may be formed so as to protrude from an overall area of the vertical stem parts.

According to an embodiment of the present disclosure, potential occurrences of a dark space in the stem parts of the pixel electrode may be prevented, and transmittance may be improved.

DETAILED DESCRIPTION OF THE EMBODIMENTS

Figure 1:
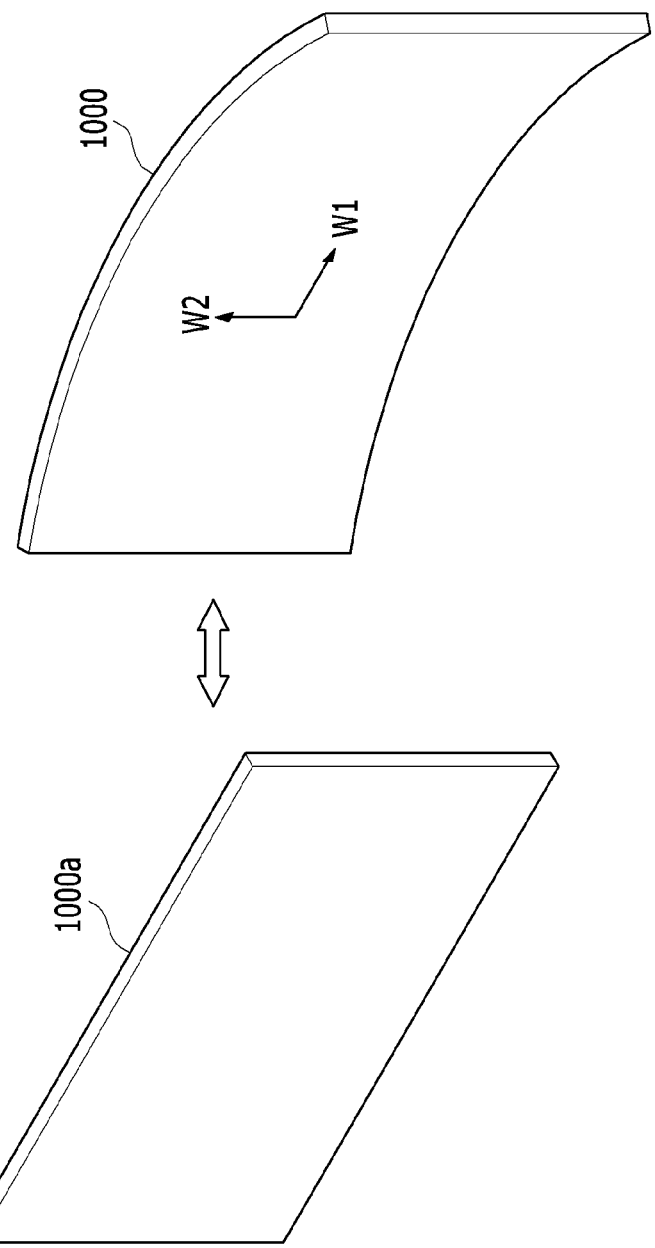
FIG. 1 is a perspective view showing a liquid crystal display according to an exemplary embodiment of the present disclosure.

Hereinafter, exemplary embodiments of the present disclosure are described in detail with reference to the accompanying drawings so that those skilled in the art may easily practice the novel teachings contained herein. The present disclosure is not limited to the exemplary embodiments described herein, which may be modified in various different ways.

Accordingly, the drawings and description are to be regarded as illustrative in nature and not restrictive. Like reference numerals designate like elements throughout the specification.

In several exemplary embodiments, components having the same configuration are described representatively in a first exemplary embodiment using the same reference numerals. In exemplary embodiments other than the first exemplary embodiment, only configurations different from those of the first exemplary embodiment are described.

In addition, the sizes and thicknesses of the respective components shown in the drawings may be exaggerated for convenience of explanation and illustration. As such, the present disclosure is not necessarily limited to those shown in the drawings.

In addition, when it is stated that a portion, such as a layer, a film, a region, a plate, or the like is present "on", "over", and "below" another portion, the portion may be directly formed on another portion, or an intervening portion may be interposed therebetween.

In addition, unless explicitly described to the contrary, the word "comprise" and its variations, such as "comprises" or "comprising", imply the inclusion of stated elements but not the exclusion of any other elements.

First, a liquid crystal display according to an exemplary embodiment of the present disclosure is described with reference to FIG. 1.

FIG. 1 is a perspective view showing a liquid crystal display according to an exemplary embodiment of the present disclosure.

As shown in FIG. 1, the liquid crystal display according to the exemplary embodiment of the present disclosure may also be used as a flat liquid crystal display 1000a having a flat shape and may also be used as a curved liquid crystal display 1000 having a predetermined curvature and a shape that is bent in a first direction W1. That is, the liquid crystal display according to the exemplary embodiment of the present disclosure may be used as both the flat liquid crystal display 1000a and the curved liquid crystal display 1000.

In the case of the flat liquid crystal display 1000a, distances from an eye of a viewer to a plurality of pixels included in the liquid crystal display are different from each other. For example, distances from the eye of the viewer to pixels disposed at both left and right edges of the flat liquid crystal display 1000a are farther than a distance from the eye of the viewer to a pixel disposed at the center of the flat liquid crystal display 1000a. On the other hand, in the case of the curved liquid crystal display 1000 according to the exemplary embodiment of the present disclosure, when the eye of the viewer is positioned at a center of curvature of the curved liquid display 1000, the distances from the eye of the viewer to the plurality of pixels are almost uniform. Since the above-mentioned curved liquid crystal display 1000 has a wider viewing angle than the flat liquid crystal display 1000a, more information may be provided to stimulate the visual cells of the viewer, and in turn, more visual information is transferred to the brain of the viewer through optic nerves. Thus, reality and an immersion degree may be further increased.

Hereinafter, the liquid crystal display according to the exemplary embodiment of the present is described in detail with reference to FIGS. 2 to 7.

Figure 2:
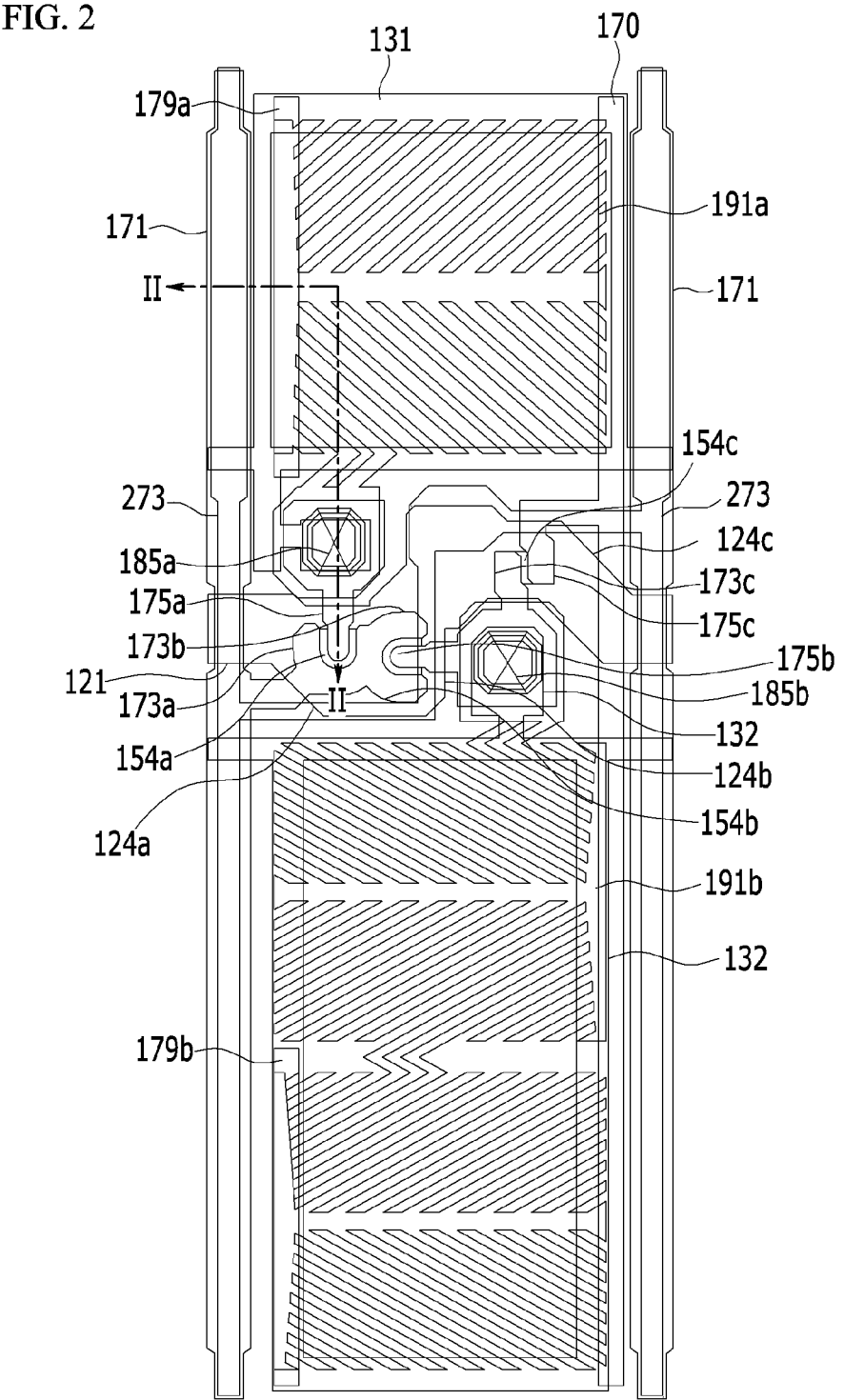
FIG. 2 is a layout view of the liquid crystal display according to an exemplary embodiment of the present disclosure.
Figure 3:
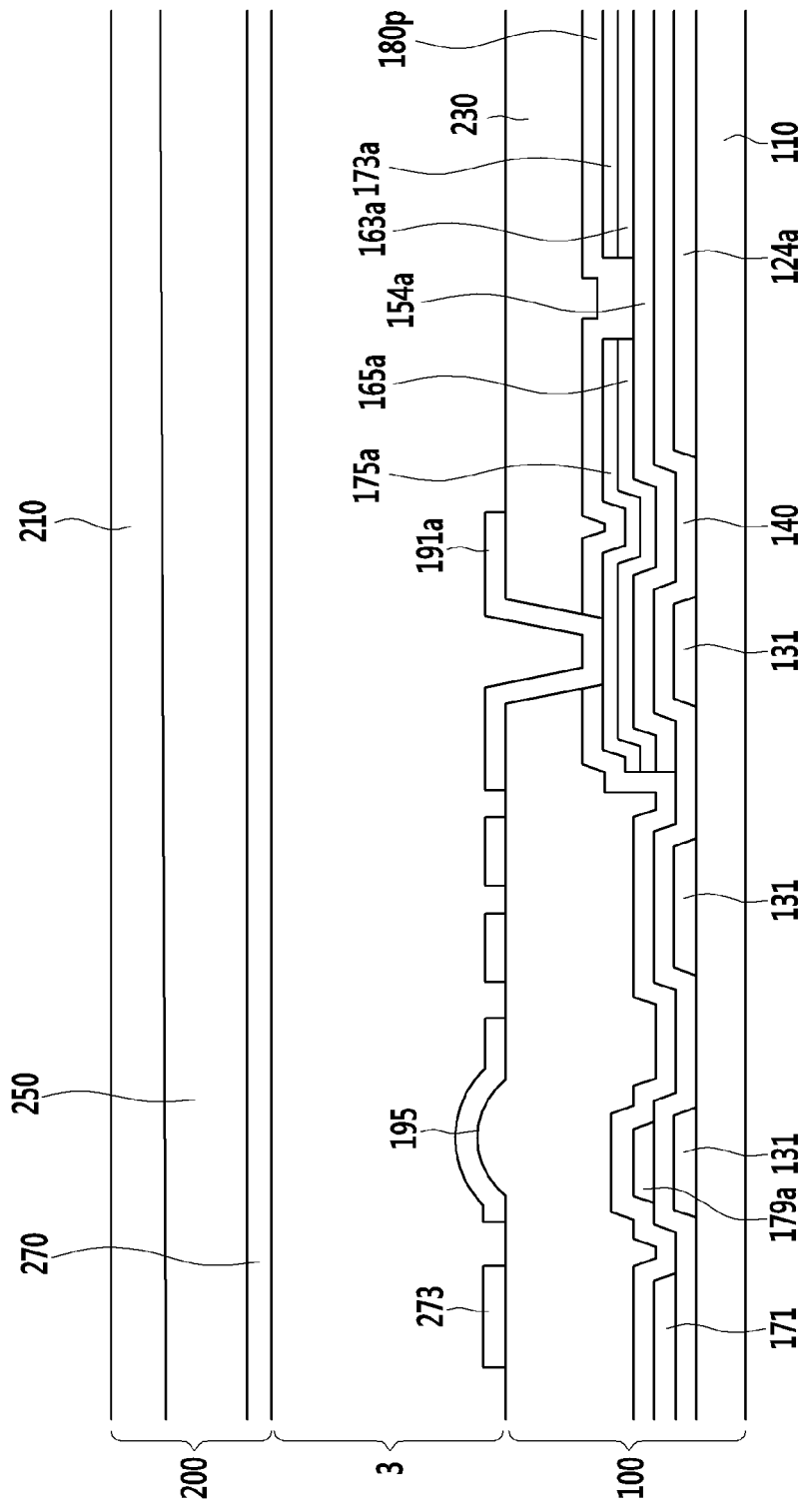
FIG. 3 is a cross-sectional view taken along a line II-II of the liquid crystal display of FIG. 2.
Figure 4:
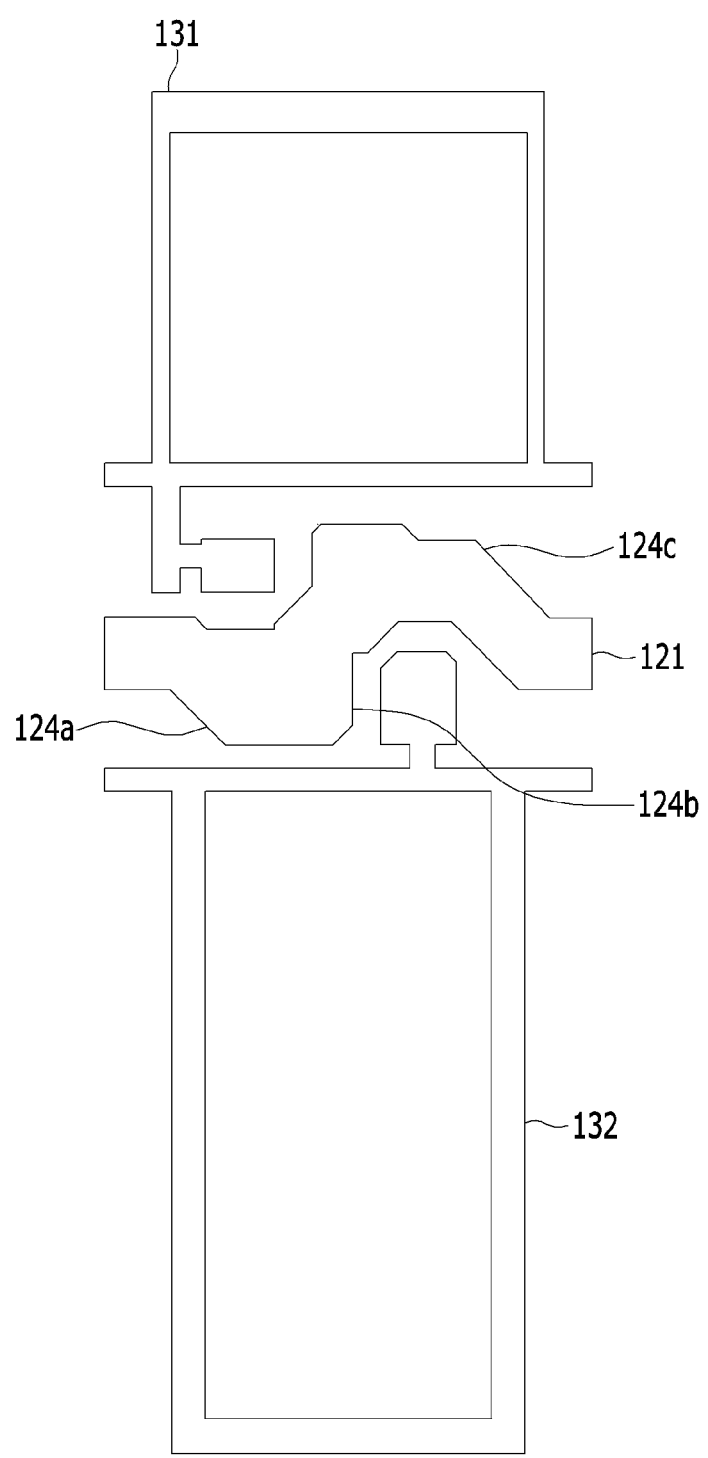
FIG. 4 separately shows gate conductors including a gate line 121, sustain electrode lines 131 and 132, and the like of the liquid crystal display shown in FIG. 2.
Figure 5:
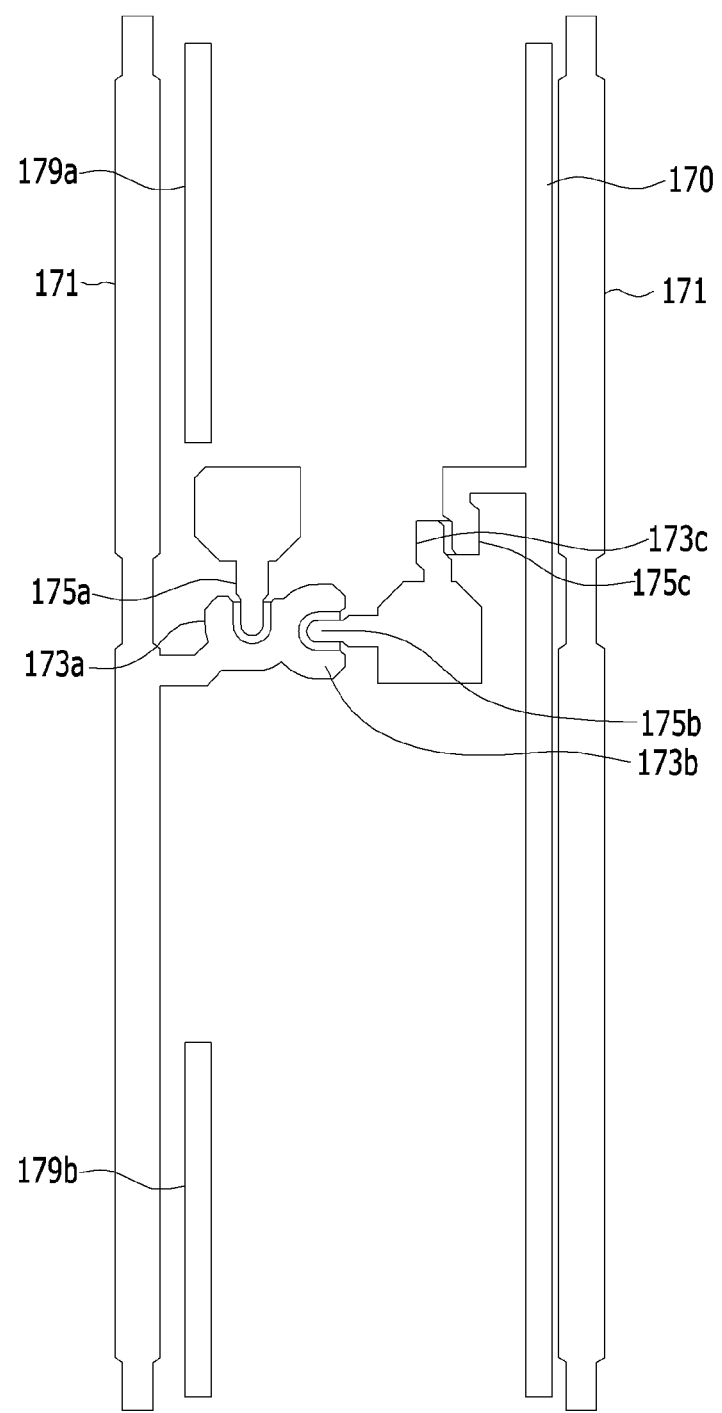
FIG. 5 separately shows data conductors including a data line 171, a voltage-dividing reference voltage line 170, and the like of the liquid crystal display shown in FIG. 2.
Figure 6:
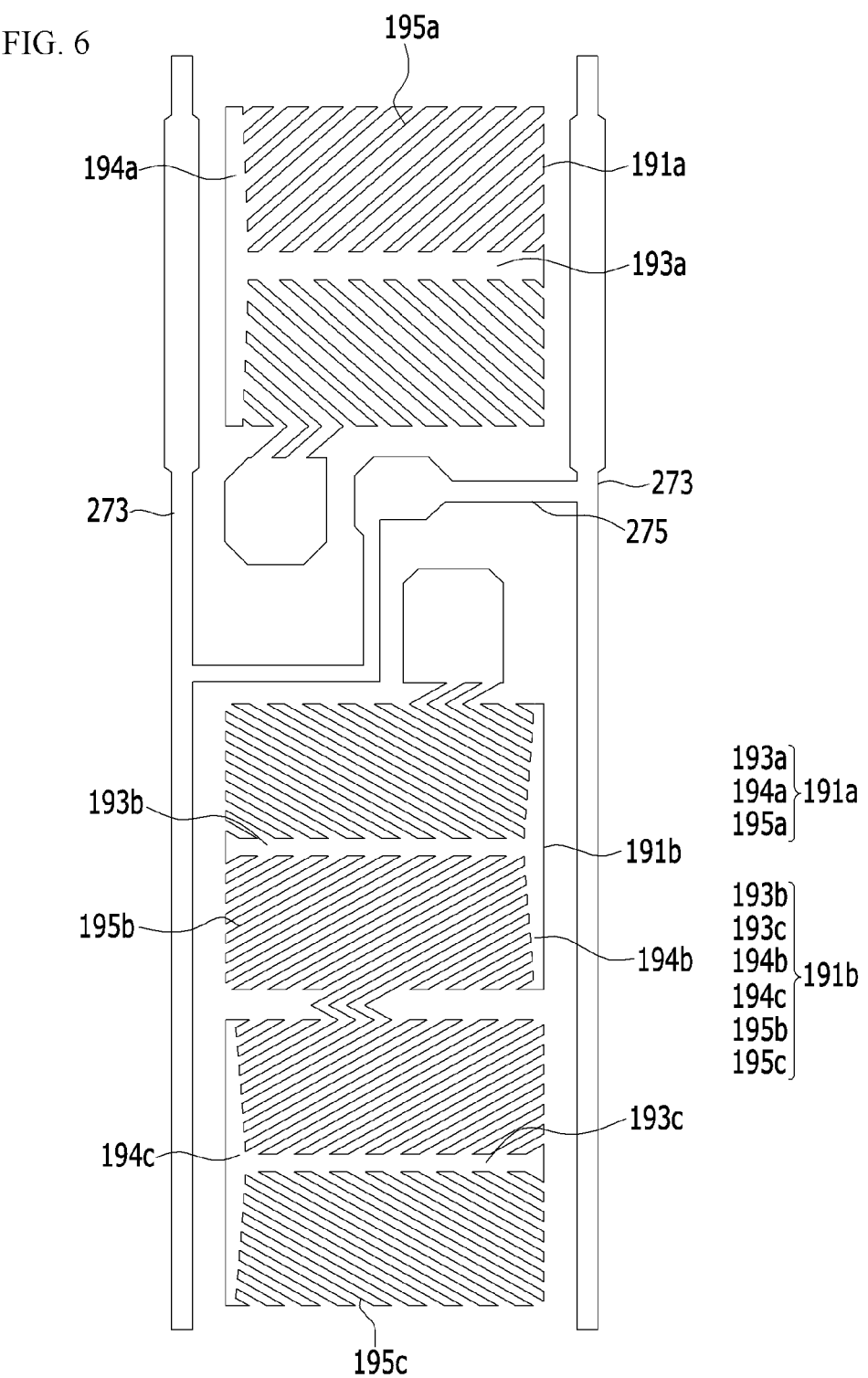
FIG. 6 separately shows a pixel electrode 191 and a shielding electrode 273 of the liquid crystal display shown in FIG. 2.

FIG. 2 is a layout view of the liquid crystal display according to the exemplary embodiment of the present disclosure. FIG. 3 is a cross-sectional view taken along a line II-II of the liquid crystal display of FIG. 2. FIG. 4 separately shows gate conductors including a gate line 121, sustain electrode lines 131 and 132, and the like of the liquid crystal display shown in FIG. 2. FIG. 5 separately shows data conductors including a data line 171, a voltage-dividing reference voltage line 170, and the like of the liquid crystal display shown in FIG. 2. FIG. 6 separately shows a pixel electrode 191 and a shielding electrode 273 of the liquid crystal display shown in FIG. 2.

First, a thin film transistor display panel 100 is described.

Gate conductors including a gate line 121 and sustain electrode lines 131 and 132 are formed on a first substrate 110, which is made of transparent glass, plastic, or the like, of the thin film transistor display panel 100.

In this context, the gate conductors of the liquid crystal display shown in FIG. 2 are described in detail particularly with reference to FIG. 4.

The gate line 121 includes gate electrodes 124a, 124b, and 124c, and a wide end portion (not shown) for connecting with other layers or external driving circuits.

The gate line 121 is mainly extended in the first direction W1, which is a horizontal direction, and transfers a gate signal. In addition, the gate line 121 is provided with a first gate electrode 124a and a second gate electrode 124b that protrude from the gate line 121. In addition, a third gate electrode 124c is formed to be spaced apart from the first gate electrode 124a and the second gate electrode 124b. The first to third gate electrodes 124a, 124b, and 124c are connected to the same gate line 121 and are applied with the same gate signal.

The gate line 121 may be made of an aluminum-based metal such as aluminum (Al), an aluminum alloy, or the like, a silver-based metal such as silver (Ag), a silver alloy, or the like, a copper-based metal such as copper (Cu), a copper alloy, or the like, a molybdenum-based metal such as molybdenum (Mo), a molybdenum alloy, or the like, chromium (Cr), tantalum (Ta), titanium (Ti), and the like. However, the gate line 121 may have a multilayer structure including at least two conductive layers having different physical properties.

The gate line 121 horizontally traverses one pixel area. An area over the gate line 121 becomes a first sub-pixel area displaying a light intensity corresponding to a higher gray scale value, and an area below the gate line 121 becomes a second sub-pixel area displaying a light intensity corresponding to a lower gray scale value.

The sustain electrode lines 131 and 132 may be made of the same material as that of the gate line 121 and may be formed by a simultaneous process with the gate line 121.

The sustain electrode line 131, which is shown in FIG. 4 as being disposed over the gate line 121 in a plan view, may have a shape surrounding the first sub-pixel area in a quadrangular shape. A side disposed at the lowest portion of the sustain electrode line 131 formed in the quadrangular shape may be extended beyond one pixel area and be horizontally extended so as to be connected to other layers or the external driving circuits.

The sustain electrode line 132, which is shown in FIG. 4 as being disposed below the gate line 121, may have a shape surrounding the second sub-pixel area in the quadrangular shape. A side disposed at the uppermost portion of the sustain electrode line 131 formed in the quadrangular shape may be extended beyond one pixel area and be horizontally extended so as to be connected to other layers or the external driving circuits.

A gate insulating layer 140 is formed on the gate conductors. The gate insulating layer 140 may be made of an inorganic insulating material such as silicon nitride (SiNx), silicon oxide (SiOx), or the like. In addition, the gate insulating layer 140 may be made of a single layer or a multilayer.

A semiconductor layer is formed on the gate insulating layer 140. The semiconductor layer includes a first semiconductor layer 154a, a second semiconductor layer 154b, and a third semiconductor layer 154c.

A plurality of ohmic contacts 163a, 165a, 163b, 165b, 163c, and 165c are formed on the semiconductors 154a, 154b, and 154c.

Data conductors including a data line 171, a voltage-dividing reference voltage line 170, and dummy voltage-dividing reference voltage lines 179a and 179b are formed on the ohmic contacts 163a, 165a, 163b, 165b, 163c, and 165c and the gate insulating layer 140. The data conductor, and the semiconductors and the ohmic contacts disposed below the data conductors may be simultaneously formed using one mask.

In this context, the data conductors of the liquid crystal display shown in FIG. 2 are described in detail particularly with reference to FIG. 5.

The data conductors include the data line 171, a first drain electrode 175a, a second drain electrode 175b, the voltage-dividing reference voltage line 170, the dummy voltage-dividing reference voltage line 179, and the like.

The data line 171 is extended in a second direction W2, which is a vertical direction, along one pixel area, and includes a first source electrode 173a and a second source electrode 173b. The first source electrode 173a and the second source electrode 173b may have a shape that is bent like a C-shape on the first and second gate electrodes 124a and 124b.

The first drain electrode 175a is formed on the first gate electrode 124a so as to be spaced apart from the first source electrode 173a. A channel is formed in a portion of the first semiconductor 154a exposed between the first source electrode 173a and the first drain electrode 175a that are formed to be spaced apart from each other.

Similarly, the second drain electrode 175b is formed on the second gate electrode 124b so as to be spaced apart from the second source electrode 173b. A channel is formed in a portion of the second semiconductor 154b exposed between the second source electrode 173b and the second drain electrode 175b that are formed to be spaced apart from each other.

A third source electrode 173c is connected to the second drain electrode 175b, includes an extended portion that is extended to be widened, and is formed on the third gate electrode 124c.

In addition, the data conductors include the voltage-dividing reference voltage line 170. A part of the voltage-dividing reference voltage line 170 is branched so as to become a third drain electrode 175c.

The third drain electrode 175c is formed on the third gate electrode 124c so as to be spaced apart from the third source electrode 173c. A channel is formed in a portion of the third semiconductor 154c exposed between the third source electrode 173c and the third drain electrode 175c that are formed to be spaced apart from each other.

The first gate electrode 124a, the first source electrode 173a, and the first drain electrode 175a form a first switching element Qa together with the first semiconductor 154a. The second gate electrode 124b, the second source electrode 173b, and the second drain electrode 175b form a second switching element Qb together with the second semiconductor 154b. The third gate electrode 124c, the third source electrode 173c, and the third drain electrode 175c form a third switching element Qc together with the third semiconductor 154c.

The data conductors include the voltage-dividing reference voltage line 170 and the dummy voltage-dividing reference voltage line 179. The voltage-dividing reference voltage line 170 is vertically extended along one pixel area and is formed to be spaced apart from the data line 171 by a predetermined interval. According to the present exemplary embodiment shown in FIG. 2, the voltage-dividing reference voltage line 170 may be formed on a right side surface of the pixel electrode 191, and may be formed to overlap the rightmost side of the sustain electrode lines 131 and 132 having a shape surrounding the sub-pixel area in the quadrangular shape.

By forming the voltage-dividing reference voltage line 170 in a straight line at a position that is spaced apart from the data line 171 by a predetermined interval, overlap between the voltage-dividing reference voltage line 170 and the pixel electrode 191 is minimized. Furthermore, as a result, a liquid crystal display having increased transmittance, as compared to a Comparative Example in which the voltage-dividing reference voltage line 170 is formed so as to across the pixel electrode, may be obtained.

The dummy voltage-dividing reference voltage line 179 is formed on the same layer as the voltage-dividing reference voltage line 170, and includes a first dummy voltage-dividing reference voltage line 179a and a second dummy voltage-dividing reference voltage line 179b, each of which is formed in an island shape so as not to be connected to other lines.

The first dummy voltage-dividing reference voltage line 179a, which is shown in FIG. 2 as being positioned over the gate line 121 in a plan view, is vertically extended along the first sub-pixel area and is formed to be spaced apart from the data line 171 by a predetermined interval. According to the present exemplary embodiment shown in FIG. 2, the first dummy voltage-dividing reference voltage line 179a is formed to overlap with a first vertical stem part 194a of a first sub-pixel electrode 191a (to be described below) and to have a length corresponding to the first vertical stem part 194a.

The second dummy voltage-dividing reference voltage line 179b, which is shown in FIG. 2 as being positioned below the gate line 121 in a plan view, is formed to be vertically extended along the second sub-pixel area from a position obtained by dividing the second sub-pixel area in half to a downward direction, and is formed to be spaced apart from the data line 171 by a predetermined interval. According to the present exemplary embodiment shown in FIG. 2, the second dummy voltage-dividing reference voltage line 179b is formed to overlap with a third vertical stem part 194c of a second sub-pixel electrode 191b (to be described below) and to have a length corresponding to the third vertical stem part 194c.

A passivation layer 180p is formed on the data conductors and exposed portions of the semiconductors 154a, 154b, and 154c. The passivation layer 180p may include an inorganic insulating layer such as silicon nitride, silicon oxide, or the like. The passivation layer 180p may prevent pigment of a color filter 230 from being introduced into the exposed portions of the semiconductors 154a, 154b, and 154c.

The color filter 230 is disposed on the passivation layer 180p. The color filter 230 may uniquely display one of a plurality of primary colors, wherein examples of the primary colors may include the three primary colors of red, green, and blue, or yellow, cyan, magenta, and the like. Although not shown, the color filter 230 may further include a color filter displaying a mixed color of the primary colors or a white color, in addition to the primary colors.

A step 195 is formed in the color filter 230 due to the first and second dummy voltage-dividing reference voltage lines 179a and 179b formed below the color filter 230. The step 195 may be formed so that the center portion thereof has a convex shape, and may be formed so that its height is decreased toward an edge when being viewed in a horizontal direction. That is, the step 195 may be formed to have a parabolic, cross-sectional shape, but the shape thereof is not limited thereto.

A first contact hole 185a and a second contact hole 185b that expose the first drain electrode 175a and the second drain electrode 175b, respectively, are formed in the passivation layer 180p and the color filter 230.

A plurality of pixel electrodes 191 is formed on the color filter 230. Each of the pixel electrodes 191 is separated by a gate line 121 disposed therebetween, so as to include the first sub-pixel electrode 191a and the second sub-pixel electrode 191b that are disposed adjacent to each other in a column direction with respect to the gate line 121. The pixel electrode 191 may also be made of a transparent conductive material such as ITO, IZO, or the like, or a reflective metal such as aluminum, silver, chromium, or an alloy thereof.

A shielding electrode 273 that is made of the same material as that of the pixel electrode 191 may be formed on the same layer as the pixel electrode 191 over the color filter 230. The pixel electrode 191 and the shielding electrode 273 may be simultaneously formed in the same process.

Here, shapes of the pixel electrode 191 and the shielding electrode 273 of the liquid crystal display shown in FIG. 2 are described in detail particularly with reference to FIG. 6.

First, the shielding electrode 273 is described. The shielding electrode 273 includes vertical portions overlapped with the data line of an edge of one pixel area and one or more horizontal portions 275 connecting the vertical portions that are adjacent to each other. The horizontal part 275 of the shielding electrode may have an extended portion at the middle thereof.

The shield electrode 273 is applied with the same voltage as that of a common electrode (not shown). Therefore, an electric field is not generated between the shield electrode 273 and the common electrode to influence the alignment of the liquid crystal molecules disposed between the shield electrode 273 and the common electrode. In other words, the liquid crystal molecules between the shield electrode 273 and the common electrode may function as a black matrix to block incident light such that a black state is display. Therefore, in the liquid crystal display including the thin film transistor display panel according to the exemplary embodiment of the present disclosure, the black matrix that is typically disposed on an upper display panel may be removed.

Next, the pixel electrodes 191 are described in detail. Each of the pixel electrodes 191 is separated by a gate line 121 formed therebetween, so as to include the first sub-pixel electrode 191a and the second sub-pixel electrode 191b that are disposed adjacent to each other in a column direction with respect to the gate line 121.

The first sub-pixel electrode 191a includes a first vertical stem part 194a formed on the left side of four sides of the first sub-pixel electrode 191a, a first horizontal stem part 193a extended from the center of the first vertical stem part 194a to the right, and first fine branch parts 195a extended from both sides of the first horizontal stem part 193a in a diagonal directions. The first fine branch parts 195a extended from the first horizontal stem part 193a are symmetrical with each other around the first horizontal stem part 193a, and are obliquely extended in directions that are away from the first vertical stem part 194a.

However, the above-mentioned direction is illustrative, and the first sub-pixel electrode 191 may also be formed in a mirror configuration in which the first horizontal stem part 193 has the first vertical stem part 194a at the right.

A portion of the fine branch parts extended from the first horizontal stem part 193a is connected to an extended portion of the first sub-pixel electrode so as to be supplied with a voltage from the first drain electrode 175a through the first contact hole 185a.

The second sub-pixel electrode 191b includes a second vertical stem part 194b formed on the right side of the second sub-pixel electrode 191b, a second horizontal stem part 193b extended from the center of the second vertical stem part 194b to the left, and second fine branch parts 195b extended from both sides of the second horizontal stem part 193b in diagonal directions. The second sub-pixel electrode 191b also includes a third vertical stem part 194c formed on the left side of the second sub-pixel electrode 191b, a third horizontal stem part 193c extended from the center of the third vertical stem part 194c to the right, and third fine branch parts 195c extended to both sides of the third horizontal stem part 193c in diagonal directions.

Two horizontal stem parts 193b and 193c are present in the second sub-pixel electrode 191b, wherein the fine branch parts of the respective horizontal stem parts have different extended directions.

The second fine branch parts 195b extended from the second horizontal stem part 193b are symmetrical with each other around the second horizontal stem part 193b, and are obliquely extended in directions that are away from the second vertical stem part 194b. The third fine branch parts 195c extended from the third horizontal stem part 193c are symmetrical with each other around the third horizontal stem part 193c, and are obliquely extended in directions that are away from the third vertical stem part 194c.

A portion of the third fine branch parts 195c extended from the third horizontal stem part 193c is connected to a portion of the second fine branch parts 195b extended from the second horizontal stem part 193b. In addition, a portion of the second fine branch parts 195b extended from the second horizontal stem part 193b is connected to an extended portion of the second sub-pixel electrode so as to be supplied with a voltage from the second drain electrode 175b through the second contact hole 185b.

The first vertical stem part 194a formed in the first sub-pixel electrode 191a of the thin film transistor display panel according to an exemplary embodiment of the present disclosure has a protrusion that protrudes upwardly (away from the substrate 110) as compared to other portions of the first sub-pixel electrode 191a, which may be a result of the step 195 formed in the color filter 230 due to the first dummy voltage-dividing reference voltage line 179a. The third vertical stem part 194c also similarly has a protrusion that protrudes upwardly (away from the substrate 110) as compared to other portions of the second sub-pixel electrode 191b, which may be a result of the step formed in the color filter 230 due to the second dummy voltage-dividing reference voltage line 179b.

A specific shape of the protrusion may be defined depending on the shape of the step 195 formed in the color filter 230. The whole first and third stem parts 194a and 194c protrude in the upward direction thereof, away from the substrate 110. Thus, when being viewed in a plan view, such as shown in FIG. 2, middle portions of the first and third vertical stem parts 194a and 194c are formed in the convex shape (i.e., protruding out of the page), and when being viewed in the horizontal direction of the first and third vertical stem parts 194a and 194c, such as shown in FIG. 3, the first and third vertical stem parts 194a and 194c may be formed so that heights thereof are decreased toward an edge. That is, the first and third vertical stem parts 194a and 194c may be formed to have a parabolic, cross-sectional of shape but are not limited thereto. For example, the first and third vertical stem parts 194a and 194c may also be convexly formed upwardly in a bar shape and may have any shape as long as the step may be formed in the whole first and third vertical stem parts 194a and 194c in the vertical direction thereof. The length of the protrusions respectively corresponds to the length of the dummy voltage-dividing reference voltage line 179a and 179b.

In addition, when the color filter 230 is formed on the upper display panel 200, the step 195 may be formed in areas corresponding to the first and third vertical stem parts 194a and 194c of the pixel electrode 191 in the passivation layer 180p.

When the protrusions are not formed in the vertical stem parts 194a, 194b, and 194c, control force of the liquid crystal molecules is weak in the vertical stem parts 194a, 194b, and 194c, unlike the fine branch part areas formed in various directions to control the liquid crystal molecules. As a result, the liquid crystal molecules in the vertical stem parts 194a, 194b, and 194c are arranged in the vertical direction, and a dark space in which transmittance is decreased relative to the whole liquid crystal display may occur.

On the contrary, when the protrusions are formed in the vertical stem parts 194a, 194b, and 194c, the liquid crystal molecules are not arranged in the vertical direction, but form an incline toward the protrusion by a fringe field formed between the protrusions of the vertical stem parts 194a, 194b, and 194c and the common electrode 270. As a result, an occurrence of the dark space in which transmittance is decreased may be prevented.

The protrusions are formed in the first and third vertical stem parts 194a and 194c in the present exemplary embodiment of FIG. 2, but this is illustrative. The protrusion may be formed in any one or more of the first to third vertical stem parts 194a, 194b, and 194c depending on a design of the pixel electrode.

The first sub-pixel electrode 191a and the second sub-pixel electrode 191b are physically and electrically connected to the first drain electrode 175a and the second drain electrode 175b, respectively, through the first contact hole 185a and the second contact hole 185b. When a data voltage is applied to the first drain electrode 175a and the second drain electrode 175b, a portion of the data voltage applied to the second drain electrode 175b is divided by the third source electrode 173c. As a result, even though the first drain electrode 175a and the second drain electrode 175b are applied with the same data voltage, the magnitude of the voltage applied to the first sub-pixel electrode 191a is larger than the magnitude of the voltage applied to the second sub-pixel electrode 191b.

Next, an upper display panel 200 is described.

An overcoat 250 is formed on a second substrate 210, which is made of transparent glass, plastic, or the like, of the upper display panel 200, and the common electrode 270 is formed on the overcoat 250. The overcoat 250 may be made of an (organic) insulating material and may be omitted.

The liquid crystal layer 3 has negative dielectric anisotropy, and liquid crystal molecules of the liquid crystal layer 3 are aligned so that major axes thereof are perpendicular to surfaces of the two display panels 100 and 200 when an electric field is not present.

The first sub-pixel electrode 191a and the second sub-pixel electrode 191b to which the data voltage is applied generate an electrical field together with the common electrode 270 of the upper display panel 200 to thereby determine a direction of the liquid crystal molecules of the liquid crystal layer 3 between the two electrodes 191 and 270. Luminance of light passing through the liquid crystal layer 3 is changed depending on the direction of the liquid crystal molecule determined as described above.

Hereinafter, an arrangement of a signal line and a pixel of the liquid crystal display according to the exemplary embodiment of the present disclosure and a driving method thereof are described with reference to FIG. 7.

Figure 7:
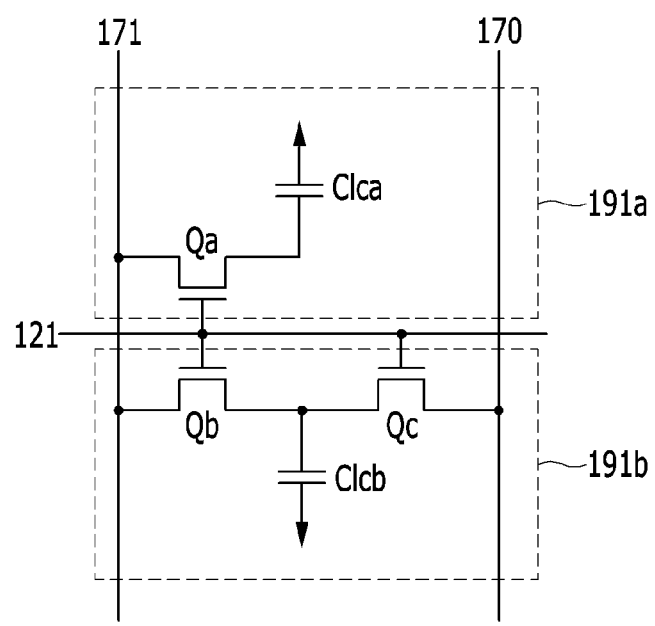
FIG. 7 is an equivalent circuit diagram of one pixel of the liquid crystal display according to the exemplary embodiment of the present disclosure.

FIG. 7 is an equivalent circuit diagram of one pixel of the liquid crystal display according to the exemplary embodiment of the present disclosure.

Referring to FIG. 7, one pixel PX of the liquid crystal display according to the exemplary embodiment of the present disclosure includes a plurality of signal lines including a gate line 121 transferring a gate signal, a data line 171 transferring a data signal, and a voltage-dividing reference voltage line 170 transferring a voltage-dividing reference voltage, and first, second and third switching elements Qa, Qb, and Qc and first and second liquid crystal capacitors Clca and Clcb that are connected to the plurality of signal lines.

The first and second switching elements Qa and Qb are each connected to the gate line 121 and the data line 171, and the third switching element Qc is connected to an output terminal of the second switching element Qb and the voltage-dividing reference voltage line 170.

The first switching element Qa and the second switching element Qb are three-terminal elements, such as a thin film transistor or the like, and have a control terminal connected to the gate line 121 and an input terminal connected to the data line 171. An output terminal of the first switching element Qa is connected to the first liquid crystal capacitor Clca, and an output terminal of the second switching element Qb is connected to the second liquid crystal capacitor Clcb and an input terminal of the third switching element Qc.

The third switching element Qc, which is also a three-terminal element, such as a thin film transistor or the like, has a control terminal connected to the gate line 121, an input terminal connected to the second crystal capacitor Clcb, and an output terminal connected to the voltage-dividing reference voltage line 170.

When a gate ON signal is applied to the gate line 121, the first switching element Qa, the second switching element Qb, and the third switching element Qc that are connected to the gate line 121 are turned on. Thus, the data voltage applied to the data line 171 is applied to the first sub-pixel electrode 191a and the second sub-pixel electrode 191b through the first switching element Qa and the second switching element Qb, which are turned on. In this case, the data voltages applied to the first sub-pixel electrode 191a and the second sub-pixel electrode 191b are not equal to each other because the data voltage applied to the second sub-pixel electrode 191b is divided by the third switching element Qc, which is also turned on. In other words, the voltage value charged in the second liquid crystal capacitor Clcb is decreased by the difference between the common voltage and the voltage-dividing reference voltage, the voltage charged in the first liquid crystal capacitor Clca is higher than the voltage charged in the second liquid crystal capacitor Clcb.

Since the voltage of the first liquid crystal capacitor Clca and the voltage of the second liquid crystal capacitor Clcb are different from each other, the tilted angles of the liquid crystal molecules in the first sub-pixel and the second sub-pixel are different, which causes the luminance of the two sub-pixels to be different from each other. When the voltage of the first liquid crystal capacitor Clca and the voltage of the second liquid crystal capacitor Clcb are appropriately adjusted, it is possible to maximally match an image viewed from the side to an image viewed from the front, thereby improving side visibility.

Although the exemplary embodiment shown in FIG. 7 shows the third switching element Qc as being connected to the second liquid crystal capacitor Clcb and the voltage-dividing reference voltage line 170 so that the voltage charged in the first liquid crystal capacitor Clca and the voltage charged in the second liquid crystal capacitor Clcb are different from each other, the second liquid crystal capacitor Clcb may instead be connected to a step-down capacitor in the liquid crystal display according to another exemplary embodiment of the present disclosure. Particularly, by connecting a first terminal of the third switching element to a step-down gate line, a second terminal of the same to the second liquid crystal capacitor Clcb, and a third terminal of the same to the step-down capacitor, the charged voltage of the first liquid crystal capacitor Clca and the second liquid crystal capacitor Clcb may be set to be different from each other because some of charges in the second liquid crystal capacitor Clcb becomes charged in the step-down capacitor. According to yet another exemplary embodiment of the present disclosure, the first liquid crystal capacitor Clca and the second liquid crystal capacitor Clcb may each be connected to data lines different from each other so as to be applied with data voltages different from each other, such that the charged voltage between the first liquid crystal capacitor Clca and the second liquid crystal capacitor Clcb may be set to be different from each other. The charged voltage between the first liquid crystal capacitor Clca and the second liquid crystal capacitor Clcb may also be set to be different from each other by other various methods, in addition to the above-mentioned methods.

Hereinafter, a liquid crystal display according to an exemplary embodiment of the present disclosure is described in detail with reference to FIGS. 8 and 9.

Figure 8:
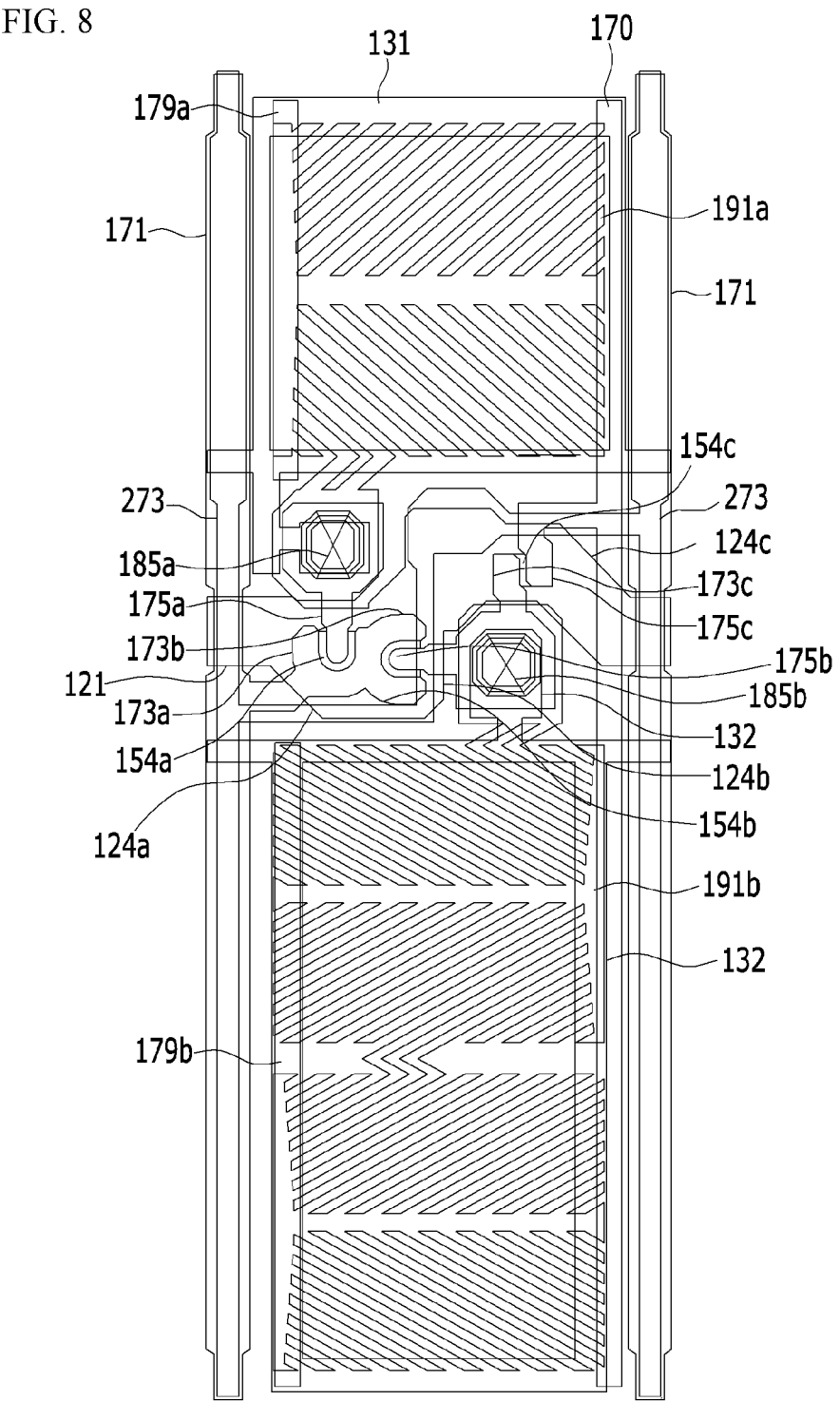
FIG. 8 is a layout view of a liquid crystal display according to an exemplary embodiment of the present disclosure.

FIG. 8 is a layout view of a liquid crystal display according to an exemplary embodiment of the present disclosure. FIG. 9 separately shows data conductors including a data line 171, a voltage-dividing reference voltage line 170, and the like of the liquid crystal display shown in FIG. 8.

A description of constituent materials and detailed structures that are the same as those described above with respect to FIGS. 2 to 6 is omitted.

The gate conductors, the gate insulating layer 140, the semiconductors 154a, 154b, and 154c, and the like are sequentially stacked on the first substrate 110 of the thin film transistor display panel 100. The data conductors including the data line 171, the voltage-dividing reference voltage line 170, and the dummy voltage-dividing reference voltage lines 179a and 179b are formed on the gate insulating layer 140, and the semiconductors 154a, 154b, and 154c.

The data conductors include the data line 171, a first drain electrode 175a, a second drain electrode 175b, the voltage-dividing reference voltage line 170, and the dummy voltage-dividing reference voltage line 179.

Figure 9:
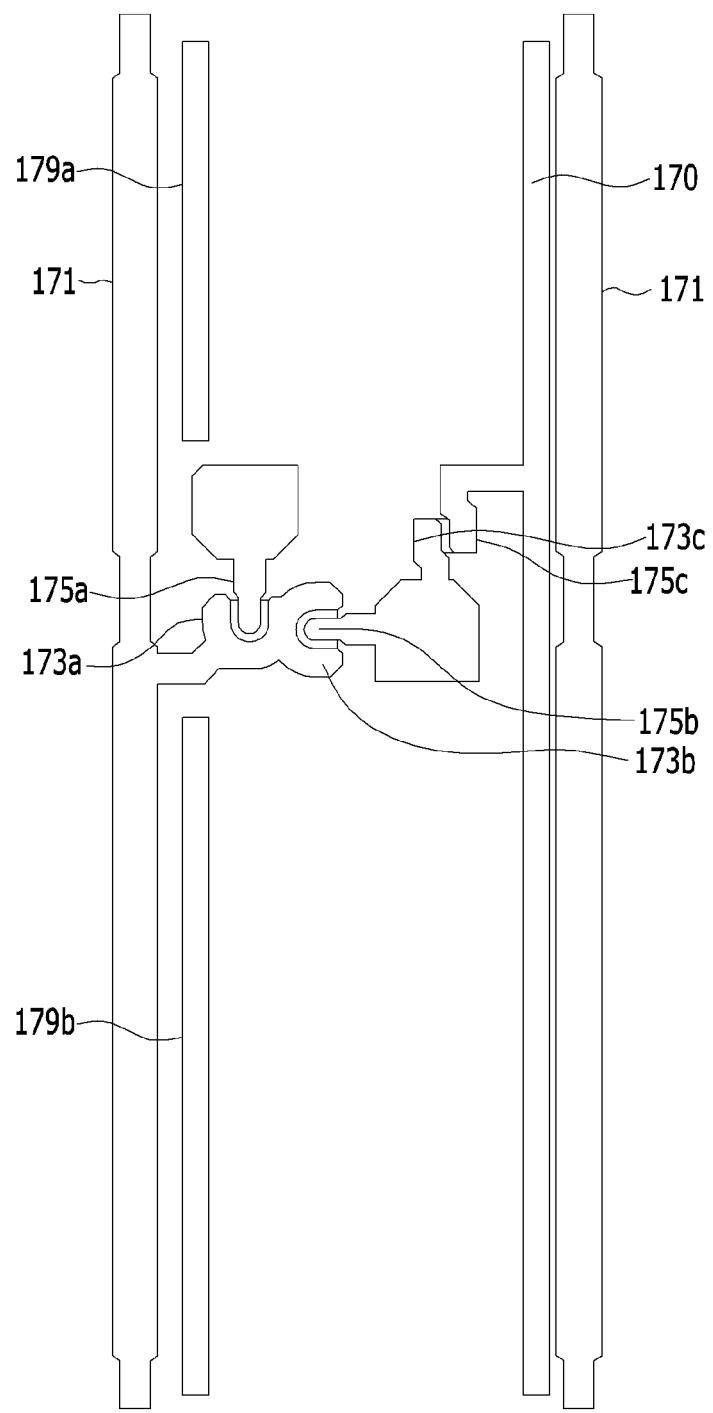
FIG. 9 separately shows data conductors including a data line 171, a voltage-dividing reference voltage line 170, and the like of the liquid crystal display shown in FIG. 8.

In this context, the dummy voltage-dividing reference voltage line 179 of the liquid crystal display shown in FIG. 8 is described in detail particularly with reference to FIG. 9.

The dummy voltage-dividing reference voltage line 179 includes a first dummy voltage-dividing reference voltage line 179a and a second dummy voltage-dividing reference voltage line 179b, each of which is formed in an island shape so as not to be connected to other lines.

The first dummy voltage-dividing reference voltage line 179a, which is positioned over the gate line 121 in the plan view of FIG. 8, is vertically extended along the first sub-pixel area and is formed to be spaced apart from the data line 171 by a predetermined interval. According to the present exemplary embodiment, the first dummy voltage-dividing reference voltage line 179a is formed to overlap with a first vertical stem part 194a of a first sub-pixel electrode 191a and to have a length corresponding to the first vertical stem part 194a.

The second dummy voltage-dividing reference voltage line 179b, which is positioned below the gate line 121 in the plan view of FIG. 8, is formed to be vertically extended along the second sub-pixel area and is formed to be spaced apart from the data line 171 by a predetermined interval. According to the present exemplary embodiment, the second dummy voltage-dividing reference voltage line 179b is formed to overlap with a third vertical stem part 194c of a second sub-pixel electrode 191b. However, unlike the exemplary embodiments shown in FIGS. 2 to 6, the second dummy voltage-dividing reference voltage line 179b is formed to have a length corresponding to an entire length of the second sub-pixel electrode 191b.

A passivation layer 180p is formed on the data conductors and exposed portions of the semiconductors 154a, 154b, and 154c, and a color filter 230 and a plurality of pixel electrodes 191 are sequentially stacked on the passivation layer 180p.

The first vertical stem part 194a of the first sub-pixel electrode 191a of the thin film transistor display panel according to the exemplary embodiment of FIG. 8 has a protrusion that protrudes upwardly (i.e., out of the page) as compared to other portions of the first sub-pixel electrode 191a, which may be a result of the step 195 formed in the color filter 230 due to the first dummy voltage-dividing reference voltage line 179a. The second sub-pixel electrode 191b also similarly has a protrusion that protrudes upwardly as compared to other portions of the second sub-pixel electrode 191b, which may be the result of the step formed in the color filter 230 due to the second dummy voltage-dividing reference voltage line 179b. The length of the protrusions respectively corresponds to the length of the dummy voltage-dividing reference voltage lines 179a and 179b.

The overcoat 250 and the common electrode 270 are sequentially stacked on the second substrate 210 of the upper display panel 200, and the liquid crystal layer 3 is formed between the upper display panel 200 and the thin film transistor display panel 100.

Hereinafter, a liquid crystal display according to an exemplary embodiment of the present disclosure is described in detail with reference to FIGS. 10 to 12.

Figure 10:
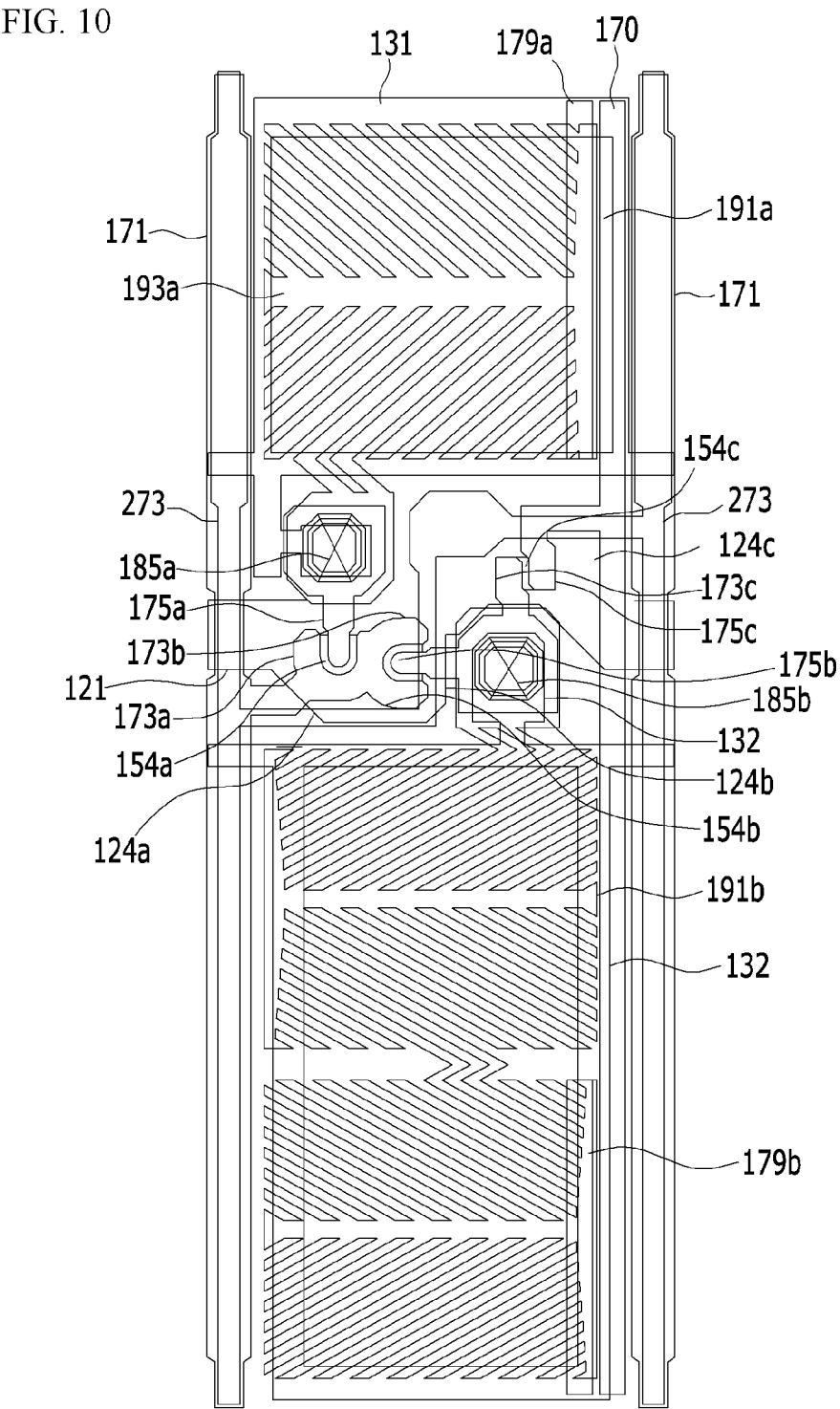
FIG. 10 is a layout view of a liquid crystal display according to an exemplary embodiment of the present disclosure.

FIG. 10 is a layout view of a liquid crystal display according to an exemplary embodiment of the present disclosure. FIG. 11 separately shows data conductors including a data line 171, a voltage-dividing reference voltage line 170, and the like of the liquid crystal display shown in FIG. 10. FIG. 12 separately shows a pixel electrode 191 and a shielding electrode 273 of the liquid crystal display shown in FIG. 10.

A description of constituent materials and detailed structures that are the same as those described above with respect to FIGS. 2 to 6 is omitted.

The gate conductors, the gate insulating layer 140, the semiconductors 154a, 154b, and 154c, and the like are sequentially stacked on the first substrate 110 of the thin film transistor display panel 100. The data conductors including the data line 171, the voltage-dividing reference voltage line 170, and the dummy voltage-dividing reference voltage lines 179a and 179b are formed on the gate insulating layer 140, and the semiconductors 154a, 154b, and 154c.

The data conductors include the data line 171, a first drain electrode 175a, a second drain electrode 175b, the voltage-dividing reference voltage line 170, and the dummy voltage-dividing reference voltage line 179.

Figure 11:
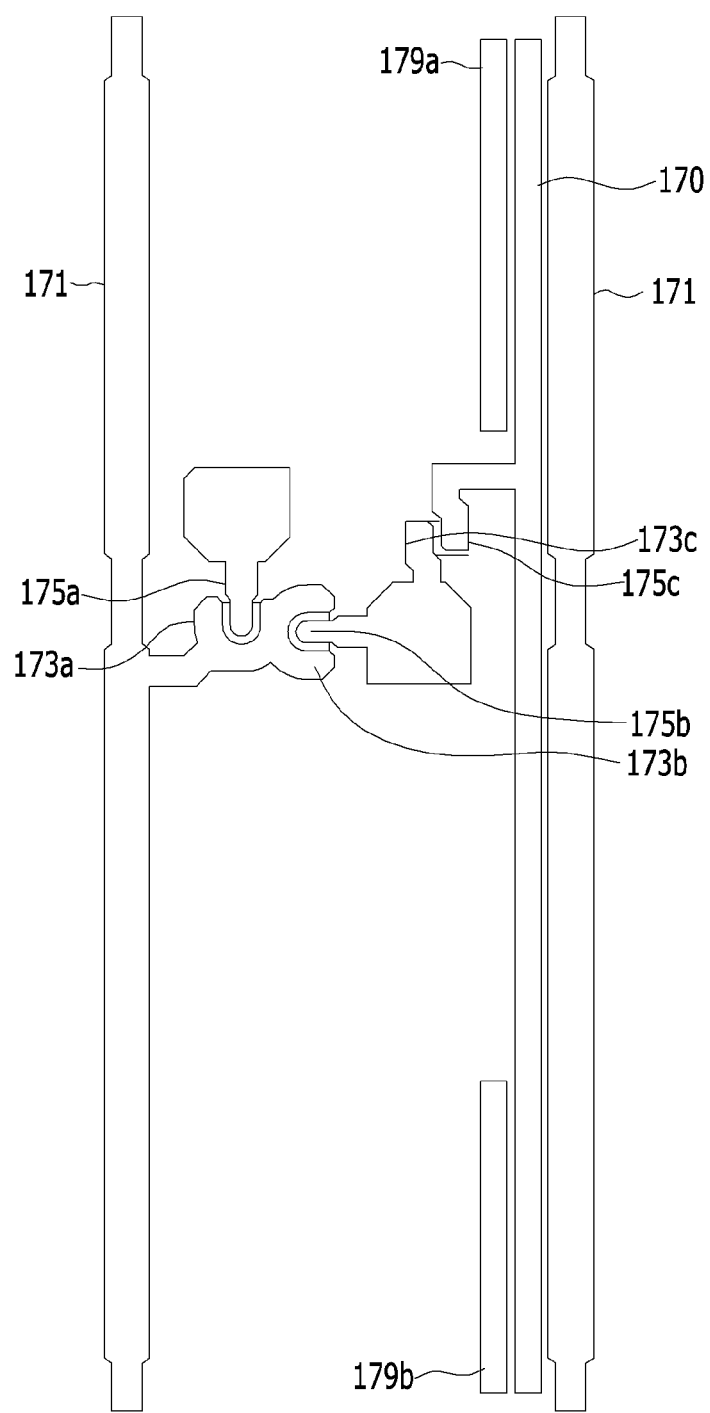
FIG. 11 separately shows data conductors including a data line 171, a voltage-dividing reference voltage line 170, and the like of the liquid crystal display shown in FIG. 10.

In this context, the dummy voltage-dividing reference voltage line 179 of the liquid crystal display shown in FIG. 10 is described in detail particularly with reference to FIG. 11.

The dummy voltage-dividing reference voltage line 179 includes a first dummy voltage-dividing reference voltage line 179a and a second dummy voltage-dividing reference voltage line 179b, each of which is formed in an island shape so as not to be connected to other lines.

The first dummy voltage-dividing reference voltage line 179a, which is shown to in FIG. 10 as being positioned over the gate line 121, is vertically extended along the first sub-pixel area and is formed to be spaced apart from the voltage-dividing reference voltage line 170 by a predetermined interval. According to the present exemplary embodiment, the first dummy voltage-dividing reference voltage line 179a is formed to overlap with the first vertical stem part 194a of the first sub-pixel electrode 191a and to have a length corresponding to the first vertical stem part 194a. However, unlike the exemplary embodiments of FIGS. 2 to 6, the first dummy voltage-dividing reference voltage line 179a is formed at the right side of the pixel area.

The second dummy voltage-dividing reference voltage line 179b, which is shown to in FIG. 10 as being positioned below the gate line 121, is vertically extended along the second sub-pixel area from a position obtained by dividing the second sub-pixel area in half to a downward direction, and is formed to be spaced apart from the voltage-dividing reference voltage line 170 by a predetermined interval. According to the present exemplary embodiment, the second dummy voltage-dividing reference voltage line 179b is formed to overlap with the third vertical stem part 194c of the second sub-pixel electrode 191b and to have a length corresponding to the third vertical stem part 194c. However, unlike the exemplary embodiments shown in FIGS. 2 to 6, the second dummy voltage-dividing reference voltage line 179b is formed at the right side of the pixel area.

A passivation layer 180p is formed on the data conductors and exposed portions of the semiconductors 154a, 154b, and 154c, and a color filter 230 and a plurality of pixel electrodes 191 are sequentially stacked on the passivation layer 180p.

Figure 12:
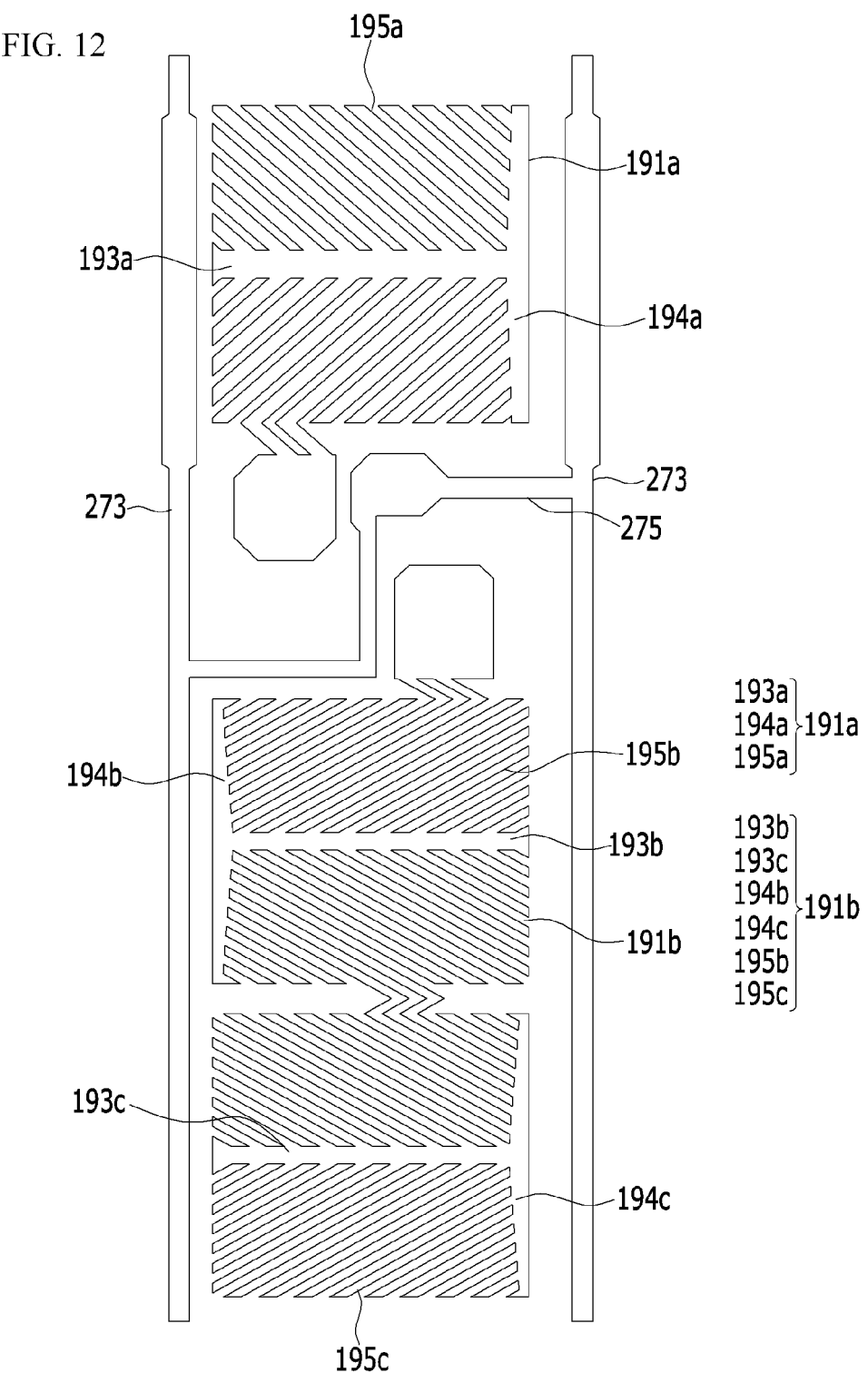
FIG. 12 separately shows a pixel electrode 191 and a shielding electrode 273 of the liquid crystal display shown in FIG. 10.

Here, the pixel electrode 191 of the liquid crystal display shown in FIG. 10 is described in detail particularly with reference to FIG. 12.

The first sub-pixel electrode 191a includes a first vertical stem part 194a formed on a left side of the first sub-pixel electrode 191a, a first horizontal stem part 193a that is extended from the center of the first vertical stem part 194a to the left, and first fine branch parts 195a extended from both sides of the first horizontal stem part 193a in diagonal directions. The first fine branch parts 195a extended from the first horizontal stem part 193a are symmetrical with each other around the first horizontal stem part 193a, and are obliquely extended in directions that are away from the first vertical stem part 194a.

The second sub-pixel electrode 191b includes a second vertical stem part 194b formed on a left side of the second sub-pixel electrode 191b, a second horizontal stem part 193b extended from the center of the second vertical stem part 194b to the right, and second fine branch parts 195b extended from both sides of the second horizontal stem part 193b in diagonal directions, and includes a third vertical stem part 194c formed on the right side of the second sub-pixel electrode 191b, a third horizontal stem part 193c extended from the center of the third vertical stem part 194c to the left, and third fine branch parts 195c extended from both sides of the third horizontal stem part 193c in diagonal directions.

Two horizontal stem parts 193b and 193c are present in the second sub-pixel electrode 191b, wherein the fine branch parts of the respective horizontal stem parts have different extended directions.

The second fine branch parts 195b extended from the second horizontal stem part 193b are symmetrical with each other around the second horizontal stem part 193b, and are obliquely extended in directions that are away from the second vertical stem part 194b. The third fine branch parts 195c extended from the third horizontal stem part 193c are symmetrical with each other around the third horizontal stem part 193c, and are obliquely extended in directions that are away from the third vertical stem part 194c.

That is, the pixel electrode 191 in the present exemplary embodiment has a shape in which the left and the right of the pixel electrode of the exemplary embodiments shown in FIGS. 2 to 6 are reversed.

The first vertical stem part 194a of the first sub-pixel electrode 191a of the thin film transistor display panel according to the exemplary embodiment of the present disclosure has a protrusion that protrudes upwardly as compared to other portions of the first sub-pixel electrode 191a, which may be a result of the step 195 formed in the color filter 230 clue to the first dummy voltage-dividing reference voltage line 179a. The third vertical stem part 194c formed in the second sub-pixel electrode 191b also similarly has a protrusion that protrudes upwardly as compared to other portions of the second sub-pixel electrode 191b, which may be a result of the step formed in the color filter 230 due to the second dummy voltage-dividing reference voltage line 179b. The length of the protrusions respectively corresponds to the length of the dummy voltage-dividing reference voltage lines 179a and 179b. Unlike the exemplary embodiments shown in FIGS. 2 to 6, the protrusions in the present exemplary embodiment are also formed at the right of the pixel area where the vertical stem parts 194a and 194b are formed.

The overcoat 250 and the common electrode 270 are sequentially stacked on the second substrate 210 of the upper display panel 200, and the liquid crystal layer 3 is formed between the upper display panel 200 and the thin film transistor display panel 100.

Hereinafter, a liquid crystal display according to an exemplary embodiment of the present disclosure is described in detail with reference to FIGS. 13 and 14.

Figure 13:
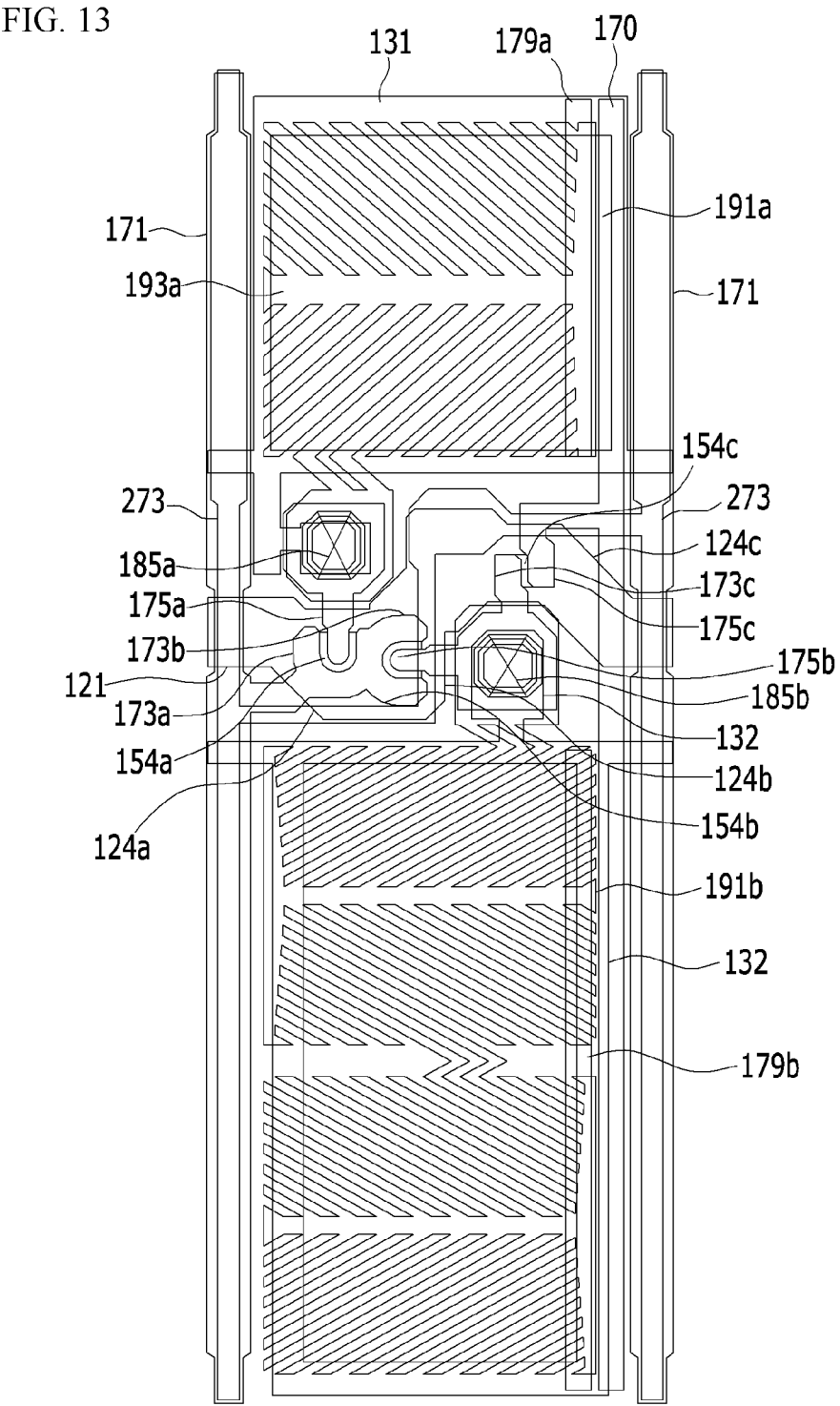
FIG. 13 is a layout view of a liquid crystal display according to an exemplary embodiment of the present disclosure.

FIG. 13 is a layout view of a liquid crystal display according to an exemplary embodiment of the present disclosure. FIG. 14 separately shows data conductors including a data line 171, a voltage-dividing reference voltage line 170, and the like of the liquid crystal display shown in FIG. 13.

A description of constituent materials and detailed structures that are the same as those described above with respect to FIGS. 2 to 6 is omitted.

The gate conductors, the gate insulating layer 140, the semiconductors 154a, 154b, and 154c, and the like are sequentially stacked on the first substrate 110 of the thin film transistor display panel 100. The data conductors including the data line 171, the voltage-dividing reference voltage line 170, and the dummy voltage-dividing reference voltage lines 179a and 179b are formed on the gate insulating layer 140, and the semiconductors 154a, 154b, and 154c.

The data conductors include the data line 171, a first drain electrode 175a, a second drain electrode 175b, the voltage-dividing reference voltage line 170, and the dummy voltage-dividing reference voltage line 179.

Figure 14:
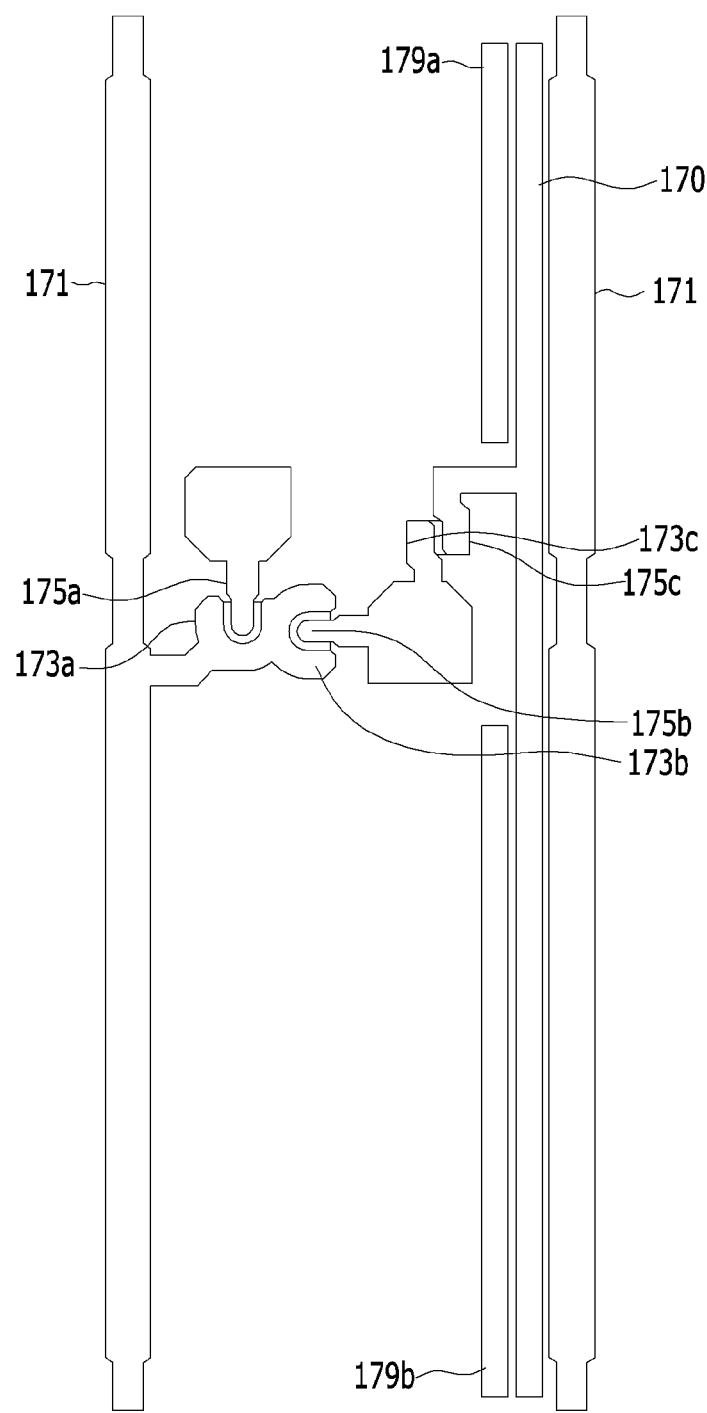
FIG. 14 separately shows data conductors including a data line 171, a voltage-dividing reference voltage line 170, and the like of the liquid crystal display shown in FIG. 13.

In this context, the dummy voltage-dividing reference voltage line 179 of the liquid crystal display shown in FIG. 13 is described in detail particularly with reference to FIG. 14.

The dummy voltage-dividing reference voltage line 179 includes a first dummy voltage-dividing reference voltage line 179a and a second dummy voltage-dividing reference voltage line 179b, each of which is formed in an island shape so as not to be connected to other lines.

The first dummy voltage-dividing reference voltage line 179a, which is shown in FIG. 13 as being positioned over the gate line 121, is vertically extended along the first sub-pixel area and is formed to be spaced apart from the voltage-dividing reference voltage line 170 by a predetermined interval. According to the present exemplary embodiment, the first dummy voltage-dividing reference voltage line 179a is formed to overlap with the first vertical stem part 194a of the first sub-pixel electrode 191a and to have a length corresponding to the first vertical stem part 194a. However, unlike the exemplary embodiments shown in FIGS. 2 to 6, the first dummy voltage-dividing reference voltage line 179a is formed at the right of the pixel area.

The second dummy voltage-dividing reference voltage line 179b, which is shown in FIG. 13 as being positioned below the gate line 121, is formed to be vertically extended along the second sub-pixel area and is formed to be spaced apart from the voltage-dividing reference voltage line 170 by a predetermined interval. According to the present exemplary embodiment, the second dummy voltage-dividing reference voltage line 179b is formed at a position overlapped with a third vertical stem part 194c of a second sub-pixel electrode 191b. However, unlike the exemplary embodiments shown in FIGS. 2 to 6, the second dummy voltage-dividing reference voltage line 179b is formed at the right of the pixel area and is formed to have a length corresponding to an entire length of the second sub-pixel electrode 191b.

A passivation layer 180p is formed on the data conductors and exposed portions of the semiconductors 154a, 154b, and 154c, and a color filter 230 and a plurality of pixel electrodes 191 are sequentially stacked on the passivation layer 180p. The pixel electrode 191 in the present exemplary embodiment has the same shape as that of the pixel electrode shown in FIG. 12 and has a shape in which the left and the right of the pixel electrode of the exemplary embodiments shown in FIGS. 2 to 6 are reversed.

The first vertical stem part 194a formed in the first sub-pixel electrode 191a of the thin film transistor display panel according to the exemplary embodiment of the present disclosure has a protrusion that protrudes upwardly as compared to other portions of the first sub-pixel electrode 191a, which may be a result of the step 195 formed in the color filter 230 due to the first dummy voltage-dividing reference voltage line 179a. The second sub-pixel electrode 191b also similarly has a protrusion that protrudes upwardly as compared to other portions of the second sub-pixel electrode 191b, which may be a result of the step formed in the color filter 230 due to the second dummy voltage-dividing reference voltage line 179b. The length of the protrusions respectively corresponds to the length of the dummy voltage-dividing reference voltage lines 179a and 179b. Unlike the exemplary embodiments shown in FIGS. 2 to 6, the protrusion in the present exemplary embodiment is also formed at the right of the pixel area where the vertical stem parts 194a and 194b are formed.

The overcoat 250 and the common electrode 270 are sequentially stacked on the second substrate 210 of the upper display panel 200, and the liquid crystal layer 3 is formed between the upper display panel 200 and the thin film transistor display panel 100.

While the present system and method have been described in connection with exemplary embodiments, it is to be understood that the present system and method are not limited to the disclosed embodiments. On the contrary, the present system and method cover various modifications and equivalent arrangements included within the spirit and scope of the appended claims.

<Description of symbols>

| | |
|---|---|
| 3: liquid crystal layer | |
| 100: thin film transistor display panel | 110: first substrate |
| 121: gate line | 124: gate electrode |
| 131, 132: sustain electrode line | 140: gate insulating layer |
| 154: semiconductor layer | |
| 170: voltage-dividing reference voltage line | |
| 171: data line | 173: source electrode |
| 175: drain electrode | |
| 179: dummy voltage-dividing reference voltage line | |
| 180p: passivation layer | 185a, 185b: contact hole |
| 191: pixel electrode | 191a: first sub-pixel electrode |
| 191b: second sub-pixel electrode | 200: upper display panel |
| 210: second substrate | 230: color filter |
| 270: common electrode | 273: shielding electrode |

What is claimed is:

1. A liquid crystal display comprising:
   a first substrate;
   a gate line formed on the first substrate and extended in a first direction;
   a data line extended in a second direction that is perpendicular to the gate line;
   a first switching element connected to the gate line and the data line;
   a second switching element connected to the gate line and the data line;
   a third switching element connected to the second switching element;
   a voltage-dividing reference voltage line connected to the third switching element;
   a first sub-pixel electrode connected to the first switching element;
   a dummy voltage-dividing reference voltage line disposed on the same layer as the voltage-dividing reference voltage line; and
   a second sub-pixel electrode connected to the second switching element,
   wherein the first sub-pixel electrode and the second sub-pixel electrode include one or more vertical stem parts formed on a left side or a right side thereof,
   the voltage-dividing reference voltage line is parallel to the data line on one side of the pixel electrode,
   the dummy voltage-dividing reference voltage line overlaps the one or more vertical stem parts, and
   the vertical stem part overlapped with the dummy voltage-dividing reference voltage line has a protrusion that protrudes further away from the first substrate than other areas of the pixel electrode.

2. The liquid crystal display of claim 1, wherein:
   the first sub-pixel electrode further includes a first vertical stem part, a first horizontal stem part extended from the center of the first vertical stem part to a side opposite to a side on which the first vertical stem part is formed, and first fine branch parts extended from both sides of the first horizontal stem part in diagonal directions, and
   the second sub-pixel electrode further includes a second vertical stem part and a third vertical stem part, a second horizontal stem part extended from the center of the second vertical stem part to a side opposite to a side on which the second vertical stem part is formed, second fine branch parts extended from both sides of the second horizontal stem part in diagonal directions, a third horizontal stem part extended from the center of the third vertical stem part to a side opposite to a side on which the third vertical stem part is formed, and third fine branch parts extended to both sides around the third horizontal stem part in diagonal directions.

3. The liquid crystal display of claim 2, wherein:
   the dummy voltage-dividing reference voltage line includes a first dummy voltage-dividing reference voltage line and a second dummy voltage-dividing reference voltage line, the first dummy voltage-dividing reference voltage line is overlapped with the first vertical stem part, and the second dummy voltage-dividing reference voltage line is overlapped with the third vertical stem part.

4. The liquid crystal display of claim 3, wherein:
   the first dummy voltage-dividing reference voltage line has a length corresponding to the first vertical stem part, and the second dummy voltage-dividing reference voltage line has a length corresponding to the third vertical stem part.

5. The liquid crystal display of claim 4, wherein:
   the first vertical stem part is formed on the left side of the first sub-pixel electrode, and the third vertical stem part is formed on the left side of the second sub-pixel electrode.

6. The liquid crystal display of claim 5, wherein:
   the dummy voltage-dividing reference voltage line is formed to be electrically isolated from other lines.

7. The liquid crystal display of claim 6, wherein:
   the liquid crystal display is bent along the first direction.

8. The liquid crystal display of claim 4, wherein:
   the first vertical stem part is formed on the right side of the first sub-pixel electrode, and the second vertical stem part is formed on the right side of the second sub-pixel electrode.

9. The liquid crystal display of claim 8, wherein:
the dummy voltage-dividing reference voltage line is formed to be electrically isolated from other lines.

10. The liquid crystal display of claim 9, wherein:
the liquid crystal display is bent along the first direction.

11. The liquid crystal display of claim 3, wherein:
the second dummy voltage-dividing reference voltage line has a length corresponding to the second sub-pixel electrode.

12. The liquid crystal display of claim 11, wherein:
the first vertical stem part is formed on the left side of the first sub-pixel electrode, and the second vertical stem part is formed on the left side of the second sub-pixel electrode.

13. The liquid crystal display of claim 11, wherein:
the first vertical stem part is formed on the right side of the first sub-pixel electrode, and the second vertical stem part is formed on the right side of the second sub-pixel electrode.

14. The liquid crystal display of claim 1, wherein:
the protrusion is formed so as to protrude from an overall area of the vertical stem parts.

* * * * *